United States Patent [19]

Kurzhals et al.

[11] 4,215,150

[45] Jul. 29, 1980

[54] PROCESS FOR THE REMOVAL OF UNDESIRABLE CONSTITUENTS FROM RAW COFFEE BEANS

[75] Inventors: Hans-Albert Kurzhals, Hambergen-Heissenbüttel; Klaus F. Sylla, Bremen, both of Fed. Rep. of Germany

[73] Assignee: decofa Kaffee-Bearbeitungs-GmbH, Bremen, Fed. Rep. of Germany

[21] Appl. No.: 902,004

[22] Filed: May 1, 1978

[30] Foreign Application Priority Data

May 5, 1977 [DE] Fed. Rep. of Germany ....... 2720204

[51] Int. Cl.² ............................................. A23F 1/04
[52] U.S. Cl. .................................... 426/430; 426/595
[58] Field of Search ............................. 426/595, 430

[56] References Cited

U.S. PATENT DOCUMENTS 3,770,456  11/1973  Roseluis et al. ................. 426/430 X

FOREIGN PATENT DOCUMENTS 2031830 12/1931 Fed. Rep. of Germany ........... 426/430
2618545 11/1976 Fed. Rep. of Germany ........... 426/430
 568719 11/1975 Switzerland ............................. 426/430

*Primary Examiner*—Joseph M. Golian
*Attorney, Agent, or Firm*—Pollock, Vande Sande & Priddy

[57] ABSTRACT

A process for the removal from raw coffee of constituents which contribute to the presence of undesired stimulants in roasted coffee, without changing the caffeine content. The process comprises treating the raw beans with the ester of an organic acid, in combination with a ketone.

14 Claims, No Drawings

PROCESS FOR THE REMOVAL OF UNDESIRABLE CONSTITUENTS FROM RAW COFFEE BEANS

BRIEF SUMMARY OF THE INVENTION

The invention relates to a process for the removal from raw coffee beans of constituents which contribute to the presence of undesired stimulants in roasted coffee.

BACKGROUND OF THE INVENTION

Roasted coffee contains substances which cause coffee beverages to be intolerable to the digestive systems of many people. These undesired stimulants are mostly substances emanating from the coffee wax (Cf. U. Harms et al., KTM, Volume 19 (1969), Issue 6, pages 6 to 9 and Issue 7, pages 6 to 9). A portion of these substances enter into the coffee beverages during the normal manner of infusion.

The tolerability of the coffee beverage can thus be considerably improved by removal of the constituents of raw coffee beans which contribute to the presence of undesired stimulants. Carbonic acid-5-hydroxy-tryptamide (C-5-HT) can be considered as the indicator for the removal of these components (Cf. J. Wurziger, "Carbonic acid-5-hydroxy-tryptamide for the evaluation of fresh and treated coffee". 5th ASIC-Colloquium, Lisbon 1971).

The reduction of removal of these constituents is supposedly possible by means of different processes. According to the "Lendrich process" (Cf. German Patent No. 576,515) water steam under pressure and, according to the process of German Published Patent Application No. 16 92 284, liquid carbon dioxide act upon the raw coffee beans. However, constituents of the raw coffee bean which contribute to the presence of undesired stimulants in the roasted coffee remain substantially unaffected by these two processes.

Furthermore, it is known to treat raw coffee beans, which have not been treated with water, with a hydrocarbon halide at an elevated temperature (Cf. German Published Patent Applications Nos. 19 60 694 and 20 31 830). While these processes effectively remove constituents which contribute to the presence of undesired stimulants normally produced during roasting, the hydrocarbon halides used must be removed as completely as possible for health reasons. A modification of this process is described in Swiss Patent No. 568,719. In this case, a caffeine-containing hydrocarbon chloride is used as solvent. The reason for this is probably the fact that the raw coffee beans are preferably subjected to soaking with water or water steam before treatment with the solvent. By adding caffeine to the hydrocarbon chloride, reduction of the caffeine content of the raw coffee beans is to be prevented.

It is also known to treat raw coffee beans with an acetic acid ester in order to remove the constituents contributing to the presence of undesired stimulants normally produced during roasting. In this context, Published German Patent Application No. 20 31 830 mentions acetic acid ethyl ester and Swiss Patent No. 568,719 acetic acid isopropyl ester, while German Published Patent Application No. 26 18 545 mentions esters with a boiling point between 50° and 100° C. which are present in freshly roasted coffee in amounts greater than 10 ppm. While constituents of raw coffee beans contributing to the presence of undesired stimulants normally produced during roasting are actually extracted with the use of these solvents, the infusion of roasted coffee made of raw coffee beans treated in this manner invariably has an undesirable aftertaste which cannot be eliminated even by intensive removal of solvent residues from the treated raw coffee beans. This aftertaste is distinct enough to be identified by laymen in a blind test.

The removal from raw coffee beans of constituents which contribute to the presence of undesired stimulants normally produced during roasting has already been attempted by treating the raw coffee beans with such ketones having boiling points between 50° and 100° C. as naturally occur in freshly roasted coffee in amounts in excess of 10 ppm (Cf. German Published Patent Application No. 26 18 545). However, raw coffee beans treated according to this process always show light spots on the surface of the beans when roasted.

DESCRIPTION OF THE PREFERRED EMBODIMENT

It is therefore the object of the process according to the present invention to remove constituents of raw coffee beans which contribute to the presence of undesired stimulants in roasted coffee, without loss of caffeine, by treating the possibly dried raw coffee beans with the ester of an organic acid at an increased temperature, without causing the roasted coffee infusion to have an undesirable aftertaste. This object is achieved by using the ester in combination with a ketone.

Surprisingly, the roasted coffee infusion made of raw coffee beans treated in accordance with the invention has no unpleasant aftertaste. Moreover, the roasted coffee beans obtained from raw coffee beans treated in accordance with the invention have no light spots on their surfaces.

Either a single ester or a mixture of esters can be used as organic acid esters. Preferably esters are used which are harmless from a health standpoint, particularly esters which occur naturally in raw coffee or in roasted coffee. The esters preferably have a low boiling point, particularly below 100° C. at normal pressure. Esters of low-molecular alkanoic acids, such as $C_1$ to $C_5$ carboxylic acids, of low-molecular alkanols, such as $C_1$-$C_5$-alkanols, are favored. The following esters can also be used to advantage: formic acid methyl esters, ethyl esters and propyl esters, acetic acid methyl esters, ethyl esters and propyl esters, propionic acid methyl esters and ethyl esters and butyric acid methyl esters. Of these, the esters of acetic acid, especially acetic acid methyl esters and ethyl esters, are particularly preferred.

Either a single ketone or a mixture of ketones can be used as the ketone according to the invention. Ketones harmless from a health standpoint are preferred. Also preferred are ketones with a low boiling point, preferably below 100° C., as well as ketones which occur naturally in raw coffee or in roasted coffee. The following ketones can be used to advantage: acetone, butanone-2, pentanone-2, pentanone-3 and methyl isopropyl ketone.

Preferred ester-ketone combinations are acetic acid methyl ester-acetone, acetic acid methyl ester-butanone-2, acetic acid ethyl ester-acetone and acetic acid ethyl ester-butanone-2.

The concentration of the ketones in the solvent mixture preferably amounts to 0.05 to 50 percent by weight. Preferred ranges of concentration of ketone are for:

| | |
|---|---|
| Acetic acid methyl ester - acetone: | 3 to 15 percent by weight ketone |
| Acetic acid methyl ester - butanone-2: | 10 to 25 precent by weight ketone |
| Acetic acid ethyl ester - acetone: | 7 to 35 percent by weight ketone |
| Acetic acid ethyl ester - butanone-2: | 20 to 50 percent by weight ketone. |

In order to facilitate the separation of the solvent from the treated coffee beans, the ketones selected preferably have similar boiling curves as the esters used. If the used ester requires high ketone concentrations, particularly such ketones are used which, in their turn, have a solubility for the constituents to be removed from the raw coffee beans.

The weight ratio of ester to dry raw coffee preferably amounts to 0.2 to 10:1, particularly 1 to 5:1, and the weight ratio of the solvent combination to dry raw coffee preferably amounts to 0.2 to 20:1, particularly 1 to 10:1. The term dry raw coffee refers to the raw coffee in its condition prior to treatment with the solvent.

The raw coffee used in the process according to the invention is not first treated with water or water steam. Consequently, the raw coffee is either used in the form in which it is supplied or it is partially dried to a water content of at least 2 percent by weight.

The process according to the invention can be effected by using any known process of solid-liquid extraction or washing process, and it can be performed on a continuous or discontinous basis.

The duration of the extraction stage according to the invention depends upon the source of the raw coffee beans, the ratio of the amount of solvent to the amount of raw coffee, the solubility of the components to be removed in the solvent combination and the type of the treatment process. In general, the extraction process takes 0.2 to 2 hours.

The temperature during the extraction stage amounts, preferably, to 40° to 120° C., especially 50° to 85° C. During the extraction stage, the pressure is preferably chosen in such a manner that the solvent used does not boil at the selected temperature.

After termination of the extraction stage according to the invention, the solvent is removed in known manner, e.g., by heating, vacuum evaporation, steaming with saturated steam or by adding liquid water and subsequent evaporation in the vacuum by adding heat. When esters and ketones are used which are natural components of the raw or roasted coffee, the solvent need be removed only to the extent that the amounts of these esters and/or ketones remaining in the treated coffee after roasting are no greater than those in untreated roasted coffee.

After the removal of the solvent, the raw coffee beans are dried in the usual manner.

EXAMPLE 1

500 g raw coffee, consisting of a mixture of different "Arabicas", with a caffeine content of 1.11 percent of weight, with reference to the dry weight, with a moisture content of 10.7 percent by weight and a C-5-HT content of 570 ppm, were treated for 20 minutes in a rotating container at a normal pressure and a temperature of 50° C. with 1000 ml of a mixture of 80 percent by weight methyl acetate and 20 percent by weight butanone-2. 940 ml solvent mixture were then drawn off. By means of a subsequent vacuum treatment of 30 minutes at 95° C., 45 ml solvent were expelled. The raw coffee was then humidified with 170 ml water to 31 percent by weight humidity and, subsequently, steamed out in a vacuum for 5 hours at 95° C. After steaming, drying was effected in the vacuum at a temperature of 80° C. The moisture content of the coffee was then 10.8 percent by weight. The treated coffee had a caffeine content of 1.12 percent by weight, with reference to the dry weight. Its C-5-HT content amounted to 213 ppm. The total of the solvents remaining in the raw coffee was below 10 ppm. The content of the raw coffee of water-soluble substances was reduced during treatment from 28.4 percent by weight to 27.8 percent by weight, with reference to the dry weight. No after-taste was noted in the infusion of the roasted coffee. The appearance of the roasted coffee showed no deviation from that of untreated roasted coffee.

EXAMPLE 2

22 kg raw coffee, consisting of a mixture of different "Arabicas", with a caffeine content of 1.06 percent by weight, with reference to the dry weight, with a moisture content of 10.2 percent by weight and a C-5-HT content of 760 ppm, were treated at normal pressure and a temperature of 70° C. with 60 l of a mixture of 55 percent by weight ethyl acetate and 45 percent by weight butanone-2 for 30 minutes. Steaming with saturated steam was then effected for 6 hours at a temperature of 105° C. Drying took place in a vacuum drying drum at 80° C. and lasted for four hours. The moisture content of the coffee then amounted to 9.7 percent by weight. The treated coffee had a caffeine content of 1.08 percent by weight, with reference to the dry weight, and a C-5-HT content of 195 ppm. A total residual solvent content of less than 10 ppm was noted in the raw coffee. The loss of water-soluble substances in the raw coffee amounted to 0.5 percent by weight, with reference to the weight of the raw coffee. The roasted coffee showed no deviation from an untreated coffee, either in its appearance or in its taste.

EXAMPLE 3

40 kg raw coffee, consisting of a mixture of different "Arabicas", with a caffeine content of 1.13 percent by weight, with reference to the dry weight, and a C-5-HT content of 685 ppm, were dried in a vacuum drying drum at 80° C. to a moisture content of 3.8 percent by weight. This was followed by a treatment with 60 l of a mixture of 95 percent by weight methyl acetate and 5 percent by weight acetone at a pressure of 2.6 bar and a temperature of 80° C. The treatment lasted for one hour. Subsequently, 58.5 l of the solvent were drawn off and steaming was effected for four hours with saturated steam at 105° C. Drying took place in a vacuum drying drum at 80° C. and lasted 3.5 hours. The moisture content of the coffee then amounted to 10.8 percent by weight. The treated coffee had a caffeine content of 1.15 percent by weight, with reference to the dry weight. Its C-5-HT content amounted to 140 ppm. A total residual solvent content of below 10 ppm was noted in the raw coffee. The loss of water-soluble substances in the raw coffee amounted to 0.4 percent by weight, with reference to the raw coffee weight. Experts adjudged the infusion of the roasted coffee to be particularly well tasting and free of aftertaste. The appearance of the roasted coffee showed no deviations in comparison to untreated roasted coffee.

What is claimed is:

1. Process for the removal of constituents from raw coffee beans which contribute to the presence of undesired stimulants in roasted coffee without a substantial loss in the original caffeine content comprising treating the raw coffee beans at an elevated temperature of 40° to 120° C.; with an ester of low-molecular weight alkanoic acid containing 1 to 5 carbon atoms with a $C_1$-$C_5$ alkanol in combination with a ketone selected from the group consisting of acetone, butanone-2, pentanone-2, pentanone-3, methyl isopropyl ketone, and mixtures thereof, wherein the concentration of the ketone based upon the total of the ester and ketone is 0.05 to 50 percent by weight; wherein the weight ratio of the combination of ester and ketone to the raw coffee beans is 0.2:1 to 20:1; and separating ester and ketone from the coffee beans to at least the extent that the amount of ester and ketone remaining in the treated coffee after roasting are no greater than that in untreated roasted coffee.

2. The process of claim 1, wherein said acid is selected from the group consisting of formic acid, acetic acid, propionic acid, butyric acid, and mixtures thereof.

3. The process of claim 1, wherein said ester is selected from the group consisting of methyl formate, ethyl formate, propyl formate, methyl acetate, ethyl acetate, propyl acetate, methyl propionate, ethyl propionate, methyl butyrate, and mixtures thereof.

4. The process of claim 1, wherein said ester is selected from a group consisting of methyl acetate, ethyl acetate, and mixtures thereof.

5. The process of claim 1, wherein said ester is selected from the group consisting of methyl acetate, ethyl acetate, and mixtures thereof and wherein said ketone is selected from a group consisting of acetone, butanone-2, and mixtures thereof.

6. The process of claim 1, wherein said ester is methyl acetate, said ketone is acetone and the amount of ketone based upon the total of ester and ketone is 3 to 15 percent by weight.

7. The process of claim 1, wherein said ester is methyl acetate, said ketone is butanone-2, and wherein the amount of ketone based upon the total of said ketone and said ester is 10 to 25 percent by weight.

8. The process of claim 1, wherein said ester is ethyl acetate, said ketone is acetone, and wherein the amount of said ketone based upon the total of said ketone and said ester is 7 to 35 percent by weight.

9. The process of claim 1, wherein said ester is ethyl acetate, said ketone is butanone-2 and wherein the amount of said ketone based upon the total of said ketone and said ester is 20 to 50 percent by weight.

10. The process of claim 1, wherein the weight ratio of the ester to the raw coffee beans is from 0.2:1 to 10:1.

11. The process of claim 1, wherein the weight ratio of the ester to the raw coffee beans is from 1:1 to 5:1.

12. The process of claim 1, wherein the weight ratio of the combination of ester and ketone to the raw coffee bena is 1:1 to 10:1.

13. The process of claim 1, wherein the removal requires 0.2 to 2 hours.

14. The process of claim 1, wherein said elevated temperature is 50° to 85° C.

* * * * *